United States Patent
Walker et al.

(10) Patent No.: US 6,282,648 B1
(45) Date of Patent: Aug. 28, 2001

(54) METHOD AND APPARATUS FOR SECURE MEASUREMENT CERTIFICATION

(75) Inventors: Jay S. Walker, Ridgefield, CT (US); Bruce Schneier, Minneapolis, MN (US); James A. Jorasch, Stamford, CT (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/706,646

(22) Filed: Nov. 6, 2000

Related U.S. Application Data

(60) Continuation of application No. 09/149,025, filed on Sep. 8, 1998, which is a division of application No. 08/628,920, filed on Apr. 8, 1996, now Pat. No. 5,828,751.

(51) Int. Cl.$^7$ .................................................. G06F 01/24
(52) U.S. Cl. .......................... 713/156; 713/161; 713/168
(58) Field of Search .................................... 713/156, 157, 713/158, 161, 166, 168, 169, 175, 176, 178

(56) References Cited

U.S. PATENT DOCUMENTS

| | | | |
|---|---|---|---|
| 3,943,336 | 3/1976 | Dillard et al. | 235/61 |
| 4,047,000 | 9/1977 | Bryant et al. | 235/151 |
| 4,108,364 | 8/1978 | Tanaka et al. | 235/419 |
| 4,123,747 | 10/1978 | Lancto et al. | 340/149 |
| 4,253,158 | 2/1981 | McFiggans | 364/900 |

(List continued on next page.)

FOREIGN PATENT DOCUMENTS

| | | |
|---|---|---|
| 0 547 837 A2 | 6/1993 | (EP) . |
| 0 727 894 A1 | 8/1996 | (EP) . |

OTHER PUBLICATIONS

"Kerberos Authentication and Authorization System" The Massachusetts Institute of Technology, dated Oct. 27, 1988.
Author Unknown, "Parallax Security Introduces "Exroy" the New Concept", PR Newswire Apr. 28, 1988.
Author Unknown, "Bellcore Spins Off New Company to Offer Digital Notary", (http://students.cec.wustl.educs142/articles/ENCRYPTION/digital notary) Download date Sep. 26, 2000.
Author Unknown, "Solana develops 'digital watermark'technology", (http://www.nexis.com/research/search/submitViewTagged), Download date Sep. 25, 2000.
Author Unknown, "Digimarc watermarking technology receives U.S. Patent", M2 Presswire, dated Jun. 16, 1997.

(List continued on next page.)

*Primary Examiner*—Thomas R. Peeso
(74) *Attorney, Agent, or Firm*—Dean P. Alderucci

(57) ABSTRACT

The invention relates to methods and apparatuses for acquiring a physical measurement, and for creating a cryptographic certification of that measurement, such that its value and time can be verified by a party that was not necessarily present at the measurement.

The certified measurement may also include corroborative information for associating the actual physical measurement process with the certified measurement. Such corroborative information may reflect the internal or external state of the measurement certification device, as well as witness identifiers of any persons that may have been present at the measurement acquisition and certification.

The certification may include a signal receiver to receive timing signals from a satellite or other external source. The external timing signals may be used to generate the time included in the certified measurement, or could be used to determine the location of the measurement certification device for inclusion in the certified measurement.

143 Claims, 2 Drawing Sheets

U.S. PATENT DOCUMENTS

| | | | |
|---|---|---|---|
| 4,376,299 | 3/1983 | Rivest | 364/900 |
| 4,637,051 | 1/1987 | Clark | 382/1 |
| 4,641,346 | 2/1987 | Clark et al. | 380/3 |
| 4,641,347 | 2/1987 | Clark et al. | 380/3 |
| 4,660,221 | 4/1987 | Dlugos | 380/23 |
| 4,807,287 | 2/1989 | Tucker et al. | 380/23 |
| 4,835,713 | 5/1989 | Pastor | 364/519 |
| 4,855,580 | 8/1989 | Van Maanen | 235/440 |
| 4,972,480 | 11/1990 | Rosen | 380/46 |
| 5,367,573 | 11/1994 | Quimby | 380/25 |
| 5,414,841 | 5/1995 | Bingham et al. | 395/600 |
| 5,448,641 | 9/1995 | Pintsov et al. | 380/51 |
| 5,463,547 | 10/1995 | Markowitz | 364/408 |
| 5,464,971 | 11/1995 | Sutcliffe | 235/379 |
| 5,490,217 | 2/1996 | Wang et al. | 380/51 |
| 5,500,897 | 3/1996 | Hartman, Jr. et al. | 380/25 |
| 5,638,186 | 6/1997 | Motoyama | 358/448 |
| 5,761,309 | 6/1998 | Ohashi et al. | 380/25 |
| 5,831,859 | 11/1998 | Medeiros et al. | 364/478 |
| 5,923,763 | 7/1999 | Walker et al. | 380/51 |
| 6,182,219 * | 1/2001 | Feldbau et al. | 713/176 |
| 6,188,766 * | 2/2001 | Kocher | 380/246 |

OTHER PUBLICATIONS

Author Unknown, "Keeping Message Secret", Federal Technology Report, dated Jul. 17, 1997.

Herrigel, A. et al., "Optical/digital identification/verificaion system based on digital watermarking technology" © 2000. Verance Corporation (http://www.verance.com/technology.htm1) Download date Sep. 26, 2000.

Russell Kay, "Sharing a Secret: How Kerberos Works", Computerworld, Dated Jul. 3, 2000. (http://www.nexis.com/research/search/submitViewTagged).

* cited by examiner

METHOD AND APPARATUS FOR SECURE MEASUREMENT CERTIFICATION

This application is a continuation of U.S. Patent Application No. 09/149,025, filed Sep. 8, 1998 for METHOD AND APPARATUS FOR SECURE MEASUREMENT CERTIFICATION; which is a continuation of U.S. Patent Application No. 08/628,920, filed Apr. 8, 1996 for METHOD AND APPARATUS FOR SECURE MEASUREMENT CERTIFICATION, which issued as U.S. Patent No. 5,828,751 on Oct. 27, 1998.

BACKGROUND OF THE INVENTION

1. Field of the Invention

The present invention relates generally to methods and apparatuses for acquiring and certifying physical measurements. More particularly, the invention relates to acquiring and cryptographically certifying a measurement representative of a physical parameter, such that the measurement can be verified at a later time.

2. Background

The use of sensors to acquire physical measurements is a pervasive and ever-expanding aspect of the electronic age. The widespread availability of low-cost, highly accurate sensor technology enables detailed measurements of physical parameters of concern to a wide variety of commercial and military applications. For example, the National Weather Service has developed the Automated Surface Observing System (ASOS) which is a cluster of sensor instruments that produce weather data. Each ASOS system is made up of eight sensors that stand in a row about 50 feet long, typically in an open field. The sensors, linked to an on-site computer, measure rainfall, wind speed and direction, temperature and dew point, air pressure, precipitation, visibility (fog and haze), cloud height, and freezing rain. Another example is Conductus Technologies' Extremely Low Frequency Antenna, which is a superconductor-based magnetic field sensor capable of measuring extremely small magnetic signals from distant sources. The system is designed for applications in mineral resource detection, experimental studies of seismic activities, and submarine communications. Yet another example is the Urban Gunshot Location System, which uses sound sensors to pinpoint the location of gunshots in a city. The sensors are mounted twenty to thirty feet above the ground, attached to poles or buildings. Data from the sensors are transmitted to a central computer which triangulates the location of the sound source to within 25 feet. The central computer then provides the location information to nearby police officers who can investigate the scene.

As shown by these applications, physical measurements are being acquired and used to guide activities having significant economic or safety implications, e.g., predicting the weather, prospecting/developing mineral resources, predicting earthquakes, securing military communications, or monitoring criminal activity. In these and many other instances where a physical measurement is to be communicated to a temporally or spatially distant recipient, the recipient would like to be assured of when the measurement was taken, as well as one or more of: what was measured, where the measurement was made, and who was present during the measurement.

For example, one application involves remote monitoring of pollution levels at a factory for round-the-clock clean air compliance verification. There, the certified measurement would include the pollution measurement and its time of acquisition. Another application might be the logging of access requests to a secure location. There, the certified measurement would include an individual's biometric identifier and his time of entry onto the premises. Yet another application might be a device to ensure house arrest. There, the certified measurement might include an individual's biometric identifier and his location. An example of an application requiring all four elements (when, what, where, and who) is the U.S. Army's Intelligence and Electronic Warfare Common Sensor System, in which land combat elements are sent into the field with intelligence-gathering sensors and subsystems. These sensors will provide tactical commanders with tools to electronically map the entire battlefield in order to identify, locate, and determine the intentions of enemy forces. In this case, it is crucial that the certified measurement accurately represent when the battlefield data were acquired, what was actually measured, where the measurement was taken, and who took the measurement, i.e., that the measurement was taken by a friendly soldier rather than an enemy who had captured or otherwise spoofed the measurement process. In general, the cryptographic certification may require elements of authenticity (measurement origin), integrity (non-modification subsequent to acquisition), and corroboration (assurance of the measurement process).

There is known a technique for using a cryptographic protocol to verify inaccessible foreign countries' compliance with nuclear test ban treaties. Simmons (1981) discloses the insertion of a seismic signal sensor, along with a public key cryptographic system, into a borehole for timestamping and encrypting measurements of seismic vibrations indicative of nuclear weapons testing. This system was designed to operate under two important constraints: 1) that the measurements be fully accessible to the Russian hosts, to ensure them that no unauthorized measurements were being taken, and 2) that the measurements be transmitted to the US in spite of lack of local access to the monitoring equipment. The first constraint compels using public key cryptography and giving the Russians the public key so they could decrypt measurements encrypted with the corresponding private key. Thus, the Russians could monitor the transmitted measurements but not impersonate them. The second constraint requires transmitting the measurements rather than storing them locally for later retrieval. These requirements are unnecessarily limiting for certain commercial applications of physical event monitoring. For example, in low-cost applications, or where the receiver has limited computational capabilities, it may be impractical to use public key cryptography because it is too computationally intensive. Instead, a simple hash (if integrity alone is required) or symmetric key encryption (if authenticity alone is required), or a combination thereof, might be appropriate. Neither of these techniques is possible with the Simmons system because of the possibility of fraud. Still other applications might require only local acquisition or storage of the certified measurement rather than transmission—which would result in significant cost and or device complexity reductions upon elimination of the transmitter and receiver. The Simmons system does not allow this possibility because of the lack of US access to Russian soil and the need to allow Russian monitoring as a precondition of measurement acquisition. Finally, the Simmons system does not describe techniques for assuring where the sensor was at the time of measurement (suppose the sensor and its surrounding soil were surreptitiously excavated between measurement transmissions and moved away from the nuclear test site).

Furthermore, there is no provision for certifying who was present during measurement (a presumably unmanned site) or to otherwise independently corroborate the measurement to a remote recipient.

There are also known various devices for cryptographically certifying the authenticity and integrity of electronic documents. Examples of such devices may be seen in several US patents (U.S. Pat. Nos. 5,189,700; 5,157,726; 5,136,647; 5,136,646; 5,022,080; 5,001,752; and 4,786,940) disclosing devices that input a digital data stream, crytographically certify the digital data, and output a digital data stream. In addition, certain of these devices optionally add time from a secure internal clock to the digital data stream.

Many of the aforementioned devices are directed at applications whose primary goal is digital data certification, rather than physical measurement certification. The devices can assure the authenticity and/or integrity of digital data presented to the device only as of the time of presentation of the data to the device. However, they can not assure: 1) when the digital data were originally acquired prior to presentation to the device, 2) what the digital data actually represent, 3) where the data were acquired prior to presentation to the device, or 4) who was present at the time of measurement. For example, such devices would be unable to certify: 1) that a digital signal representative of a physical measurement was not acquired at an earlier time and subsequently provided to the measurement certification device, 2) that the purported physical measurement really is a physical measurement (rather than a man-made signal), 3) that the physical measurement came from where it was supposed to, rather than from an alternate location, and 4) who made or witnessed the physical measurement.

In a variation of digital data certification, cryptographic techniques have been used to certify an image recorded by a digital camera. In one known example of this technology, Aquila Technologies (1996) discloses a digital image authentication system that is analogous to, and shares the same drawbacks of, the aforementioned digital data certification technologies—a lack of assurance as to the physical measurement itself. At best, a camera can only be said to certify an image rather than a physical measurement. Even if an image is taken of a sensor purportedly displaying the result of a physical measurement, there is no guarantee of the physical measurement itself. For example, a timestamped photograph of a thermometer reading is meaningless because one is not assured of when the reading was taken (suppose the camera takes a picture of a picture of an earlier reading), what is being read (maybe the thermometer has just come out of an ice bath), where the measurement was taken, or who witnessed the measurement.

Thus, there exists a need for a device and method for acquiring and certifying a physical measurement, using a wide variety of cryptographic protocols, such that the value and time of measurement can be verified by a party that was not necessarily present at the time the measurement was taken. There further exists a need for a device and method which assures where the measurement was acquired. Finally, there exists a need for a device and method which can accomodate independent corroborative evidence of the measurement or certification event.

SUMMARY OF THE INVENTION

An object of the present invention is provide an apparatus and method for acquiring and certifying a physical measurement, using a wide variety of cryptographic protocols, in a manner that the physical measurement and its time of acquisition can be verified by a later recipient of the certified measurement. Another object of the invention is to provide an apparatus and method for certifying where a physical measurement was acquired. Yet another object of the invention is to provide an apparatus and method for reliably associating the actual physical measurement with the certified measurement. As will be appreciated by those skilled in the art, terms such as certified measurement, certified message, certification, and other equivalents may all be used to denote the output of the measurement certification and device.

In connection with the foregoing, in one embodiment of the invention, a measurement certification device encloses a sensor for providing a measurement representative of a physical parameter, a battery-powered clock, a cryptographic processor, and a memory within a tamper-resistant environment. The cryptographic processor performs a cryptographic operation on the physical measurement and a representation of time to produce a cryptographically assured, timestamped, certified measurement. As used herein, the term ötimeö shall be understood to include time, date, day-of-week and any other chronographic measure. In many cases, such measures are effectively synonymous; for example, many computer clocks record time as the number of seconds elapsed since Jan. 1, 1900, which is easily converted to date and day-of-week formats.

The physical parameter could be any physical quantity measurable by a sensor and representable in digital form, including location data, biometric data, temperature, humidity, light levels, noise levels, precipitation, pressure, momentum, odor, air pollution, car exhaust, water purity, weight, orientation, acidity, proximity, opacity, radioactivity, viscosity, chemical content, and any other physical parameter whose value and time of measurement is to be certified to a recipient for later verification.

The degree of cryptographic processing depends on the degree of security that is desired. For example, where the primary concern is integrity, a simple one-way algorithm, e.g. a hash, message authenticity code (MAC), or cyclic redundancy check (CRC), might be adequate. Where the measurement certification device is used to certify a sequence of measurements on a frequent basis, a chain of hashes—where each certified measurement also includes representations of one or more previous measurements—provides an additional degree of measurement integrity. In other cases, the measurement certification device might sign the time with a device-specific private key, to provide authenticity in addition to integrity. Even greater assurance can be provided by adding unique device IDs, challenge-response protocols, digital certificates, combinations of symmetric and asymmetric (public key) encryption, and many other cryptographic techniques, in patterns appropriate to the particular application at hand.

In another embodiment of the invention, the measurement certification device need not generate its own time internally. Rather, the measurement certification device may include a receiver to obtain time from the timing signals provided by one or more Global Positioning System (GPS) satellites, or from radio signals from the US Naval Observatory atomic clock or any other reliable external source. Externally originating time is especially advantageous for deterring hacking of an internal clock. The receiver could either replace or supplement the clock. In addition, the clock could be used to double-check the received time (or vice-versa) by comparing the externally originating time against the internal clock time. The received time would be deemed accurate if the two times agreed to within the cumulative inaccuracies of the received signal (external time source inaccuracy plus any uncorrected transmission delay) and the internal clock. Finally, the cryptoprocessor could be programmed to receive the signal encrypted in the time transmitter's private key, or in the receiver's public key, as an extra measure of assurance that an impostor has not substituted an incorrect time for that of the broadcast source.

Certain of the external timing signals (e.g., GPS) may also be used to determine location information, which can be incorporated into the certified measurement as the primary physical parameter. In such a case, the external signal receiver itself would serve as the physical measurement sensor. Alternatively, the device could include a physical measurement sensor distinct from the external signal receiver. In that case, the sensor would provide the physical measurement, and the external signal receiver would provide either time and/or location information for inclusion with the certified physical measurement. Location certification finds application in devices to limit vehicle operation to a prescribed area, verify routes traveled, enforce house arrest, and numerous other monitoring and signaling applications.

The certified measurement may be outputted in a variety of formats, for example, as a physical stamp or an electromagnetic signal. In the former case, the device could include handheld printers, facsimile machines, computer printers, copiers, or any other document production device. In the latter case, the signal could be: 1) recorded to magnetic, optical, or semiconductor media, 2) sent to a display for viewing. Finally, instead of a local output device, the certified measurement could be transmitted (over wireless or physical networks) to a remote site for printing, recording or display thereat.

Furthermore, the certified measurement may be outputted at a variety of frequencies, for example: 1) at predetermined times, 2) upon request of either the user or the recipient, 3) upon presentation of a request encrypted in a public key corresponding to the private key of the measurement certification device, 4) upon production of data by the output device, or 5) under control of a broadcast signal. Requests for measurement certification would be received by an input device which generates a certified measurement request to direct the cryptographic processor to form the certified measurement. The input device need not be a separate element, but could comprise the sensor, the external signal receiver, or any other device capable of detecting a triggering event to order the certified measurement request.

As one specific example of the many possible output formats and frequencies, a transmitter could be included in the measurement certification device for transmitting a location measurement to a remote receiver on a periodic basis. Conversely, if the measurement is transmitted in response to an abnormal event detected by a sensor, the certified measurement could serve as an automated distress signal. For certain applications, the measurement certification device could even be connected to an automatic disconnect or 'dead man's switch' to automatically disable dangerous equipment until assistance arrives.

In general, a recipient of the certified measurement can determine its authenticity and/or integrity by performing cryptographic operations on the cleartext and/or ciphertext parts of the certified measurement. For example, in the case of a hashed measurement, the recipient can verify the measurement by recomputing the hash and comparing it with the received hash (the ciphertext part of the certified measurement). The hash could even be a keyed operation to provide greater security. Or, if the measurement was encrypted with the device private key, the recipient can use the corresponding device public key to decrypt and verify the measurement. The public key could either be obtained from a public database or distributed using digital certificates within the certified measurement. Alternatively, instead of public/private key pairs, the measurement certification device could use a symmetric key—either alone or in combination with public key cryptography.

The measurement may include additional features to increase confidence therein. For example, the measurement could include a unique device ID to identify itself to a measurement recipient. Furthermore, the measurement certification device could prevent re-use of a previous measurement by using a challenge-response protocol in which the requestor transmits a random number to the device for inclusion in the measurement. Alternatively, the device could include a random number generator for local generation of the random number. Those skilled in the art will appreciate that the challenge can use any datum whose value is unpredictable by the recipient; random numbers happen to be a particularly convenient choice.

Finally, the device may include a signal generator for providing a corroborative datum, indicative of an operational condition of the device, to be included in the certified measurement. The corroborative datum could be any quantity that independently attests to the acquisition of the physical measurement. For example, the device could include an internal state detector providing a 'normal operation' signal as long as the device's security measures were intact and functional. Conversely, an external state detector could provide a normal operation signal indicating that the device was being operated within a prescribed range of enviroimental conditions. Alternatively, the external state detector could be a secondary sensor providing a measurement corroborative of the primary sensor measurement being certified (e.g., a temperature detector in addition to a smoke detector for a certified fire alarm application). Still other possibilities include human witnessing of the physical measurement, either through keypads or memory readers for witnesses to input their witness identifiers. Alternatively, biometric measures could be used for positive witness identification.

The features and advantages of the present invention will be more readily understood and apparent from the following detailed description of the invention, which should be read in conjunction with the accompanying drawings, and from the claims which are appended at the end of the detailed description.

DETAILED DESCRIPTION OF THE INVENTION

Devices and methods are disclosed for acquiring and certifying a physical measurement which may be verified by a party that was not necessarily present during the measurement. For example, the measurement could be used for remote monitoring, access control, or event detection.

In this disclosure, certain ancillary elements used in conjunction with the measurement certification device are well understood to those skilled in the art and are not shown in order not to obscure the present invention. For example, the design and construction of clocks, computer memories, and software or hardware cryptographic algorithms, are well known to those skilled in the art and will not be described in detail herein.

Measurement Certification Device and Operation

Figure 1:
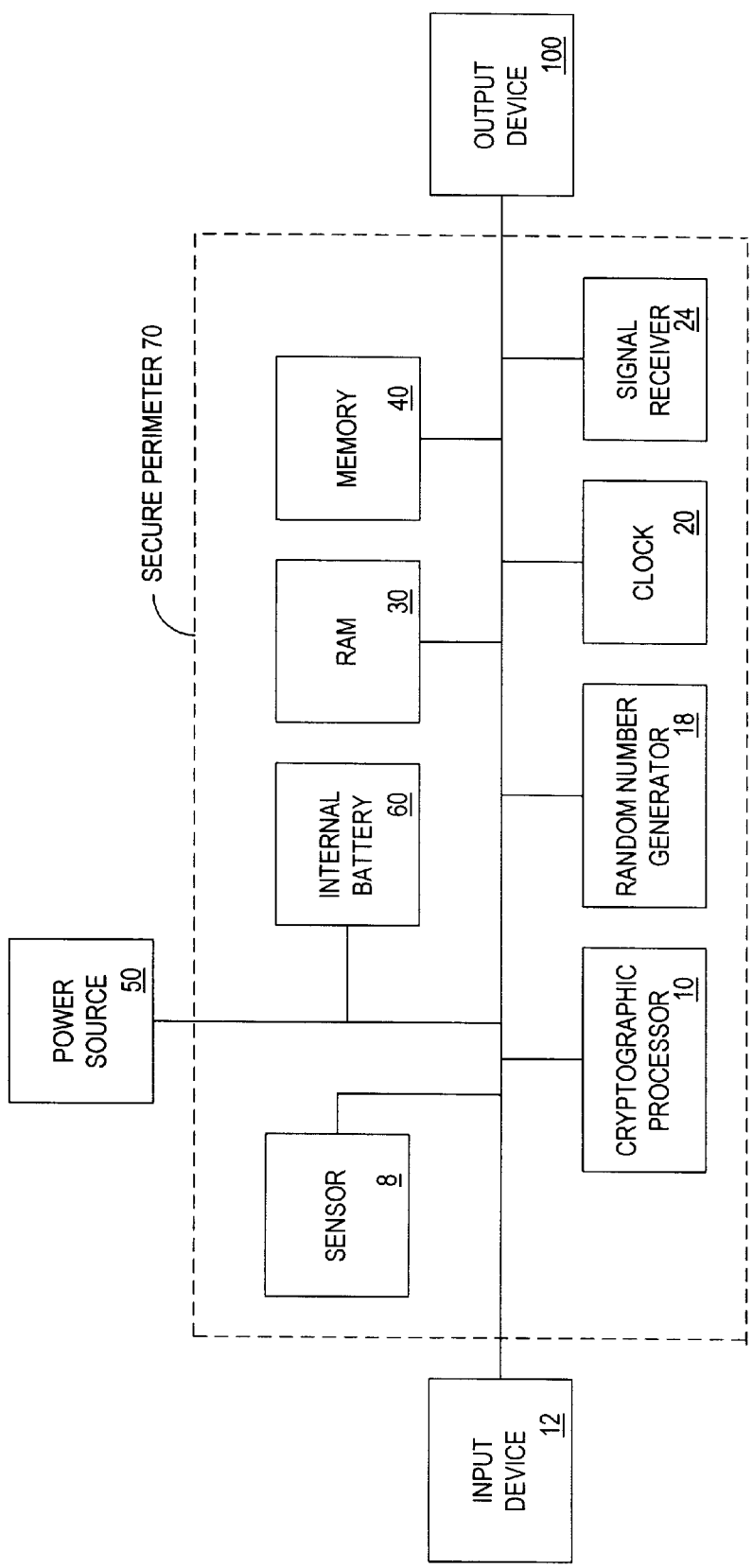
FIG. 1 illustrates the basic components of a device for secure certification of a physical measurement.

Referring now to FIG. 1, there is shown one embodiment of a measurement certification device including a sensor 8, a cryptoprocessor 10, a clock 20, random access memory (RAM) 30, nonvolatile memory 40 and output device 100. The cryptoprocessor 10 can be a general purpose processor (e.g., an Intel CPU) receiving instructions from RAM 30 or memory 40, or it can be a special purpose processor optimized for performing cryptographic operations (e.g., a National Semiconductor iPower SPU). That is, the cryptoprocessor may comprise any hardware or software engine capable of performing cryptographic operations on a given quantity. As described in greater detail below, such operations may include both keyless and keyed operations, as well as various combinations thereof. The cryptoprocessor 10 and clock 20 are powered by external power source 50, with standby battery 60 to ensure operability during replacement or absence of external power source 50. Thus, external power source 50 could be a user-replaceable battery or an AC power source. Alternatively, the device could be powered by internal battery 60 alone (in which case the device stops functioning at battery death) or external power source 50 alone (necessitating resetting the clock from a trusted external time source—e.g., the GPS satellite signals discussed later—upon powerup).

The cryptoprocessor 10, clock 20, RAM 30, memory 40 and the control signals for output device 100 are contained within secure perimeter 70, making these components resistant to tampering. The sensor 8 is also contained within the secure perimeter 70, to the maximum extent possible consistent with being able to detect the physical parameter being measured—which will vary with the application at hand. At a minimum, this would require that electronic communications between the sensor and other components of the measurement certification device be within the secure perimeter, to prevent fraudulent insertion of a signal masquerading as the measured quantity. Secure perimeter 70 may include physical, electronic, or a combination of physical and electronic features to resist tampering. For example, physical features could include encapsulation, electronic features could include a silicon firewall, and combination features could include self-zeroizing, or otherwise volatile, RAM 30 or memory 40 which electrically modifies its contents upon detection of tampering. Such tampering might include physically stressing the device, attempting to change the clock rate by replacing external power source 50 with a battery outside allowable current or voltage ranges, or attempting to change the clock rate by replacing external power source 50 with an AC power source operating outside an allowable frequency range. Alternatively, secure perimeter 70 could be merely tamper-evident. In that case, the process of measurement verification should include checking the measurement certification device for evidence of tampering. As will be appreciated by those skilled in the art, a great variety of tamper-resistant/tamper-evident techniques can be deployed, and will not be enumerated in detail herein. Therefore, as a matter of convenience, terms such as ôtamper resistantö or ôsecureö shall be understood to refer to any of the aforementioned or other security measures throughout this discussion.

In the simplest embodiment of the invention, the measurement certification device takes a physical measurement using sensor 8, of any physical parameter or event—e.g., location information, temperature, humidity, light levels, noise levels, precipitation, pressure, momentum, odor, air pollution, car exhaust, water purity, weight, orientation, acidity, proximity, opacity, radioactivity, viscosity, chemical content—whose value and/or time of measurement is to be provided to a recipient for later verification. This measurement is added to a time from clock 20, creating an augmented measurement comprising the cleartext time plus the physical measurement. Cryptoprocessor 10 then creates a certified measurement comprising the (cleartext) augmented measurement and a (ciphertext) one-way function representative of at least a portion of the augmented measurement, and outputs the certified measurement at output device 100. As used herein, a one-way function is one that outputs a unique representation of an input such that a given output is likely only to have come from its corresponding input, and such that the input can not be readily deduced from the output. Thus, the term one-way function includes hashes, message authenticity codes (MACs—keyed one-way functions), cyclic redundancy checks (CRCs), and other techniques well known to those skilled in the art. See, for example, Bruce Schneier, ôApplied Cryptography,ö Wiley, 1996. As a matter of convenience, the term ôhashö will be understood to represent any of the aforementioned or other one-way functions throughout this discussion. Typically, the hash would be performed by cryptoprocessor 10 using a hardwired hashing algorithm or one stored in RAM 30 or memory 40. The hash may either be a keyed or keyless operation.

Furthermore, a unique device identification number, stored in RAM 30 or memory 40, can be added to the hash to provide assurance of authenticity. A recipient wishing to verify the time would read the cleartext part of the certified measurement (e.g., the physical measurement, time, and device ID) and the ciphertext part of the measurement (e.g., a hash of a portion of the cleartext part), then perform an identical hashing algorithm on the appropriate portion of cleartext part to recompute the hash. If the received and recomputed hashes agree, the recipient is assured that the measurement came from the measurement certification device and had not been altered subsequent to certification.

Where the measurement certification device is used to certify a sequence of measurements, a chain of hashes—where each certified measurement also includes representations of one or more previous certified measurements—provides an additional degree of assurance. For example, RAM 30 or memory 40 could store a hash of the last three certified measurements to be incorporated into the current certified measurement as shown in the following example. Imagine that certification is performed once monthly, with the latest four dates being: 11/19, 12/15, 1/13, and 2/24. The hash for the last measurement could be Hash_2/24=Hash (ôMeasurement of 2/24 ö)+Hash_11/19+Hash_12/15+Hash_1/13, with the hashes for the November, December and January dates relating to their respective previous three months in a similar fashion. The chained hashes discourage fraudulent modification of a measurement as described below.

Suppose a forger discovers the device private key and uses it to change both the cleartext and hashed parts of the 11/19 certified measurement. A suspicious party could challenge the 11/19 certified measurement by using it to recompute the subsequent three certified measurements, and comparing them with their known values. If the known and recomputed certified measurements disagree, the 11/19 measurement is demonstrated to have been altered. When tampering is generally suspected but no specific certified measurement is in question, an altered certified measurement can be determined by recomputing the most recent certified measurement and continuing backwards until three successive incorrect certified measurements are found. Of course, the forger could theoretically change all the certified measurements in the chained hash, but this would require more effort than changing just the desired one, and would increase the chances of detection.

Still greater assurance of integrity and authenticity can be obtained by encrypting part or all of the measurement in cryptoprocessor 10 using a key stored in memory 40. For example, instead of hashing, the physical measurement and/or time might be encrypted with a device-specific private key if authenticity is required, with a recipient-specific public key if confidentiality is desired, or with both.

Certain well-known enhancements to public key cryptography could also be used to provide greater assurance. For example, the measurement could include digital certificates for public key distribution to a party that does not know the device public key needed to verify a measurement encrypted with the device private key. In a digital certificate, the device public key is encrypted (and vouched for) by the private key of a trusted certifier (e.g., a well known manufacturer of the measurement certification device) whose public key is known to the recipient. The recipient uses the certifierÆs public key to decrypt the device public key, then uses the device public key to verify the measurement. Alternatively, the recipient could simply obtain the device public key from a publicly accessible database, eliminating the need for digital certificates.

To this point, asymmetric (public key) encryption has been discussed in the context of the various cryptographic operations. However, symmetric key (e.g., DES) key encryption is also possible, either as a replacement for, or adjunct to (e.g., a symmetric session key transmitted using public key cryptography) public key cryptography.

Another commonly used cryptographic technique, the so-called challenge-response protocol (CRP), may be used to ensure to a recipient that a measurement is current, i.e., not a copy of a previously used measurement. In the CRP, a measurement requestor challenges the measurement certification device by transmitting a datum to the measurement certification device, and checking for the same datum in the received response. Thus, reused certified measurements are prevented (or at least detectable) because a reused certified measurement would contain a datum corresponding to a previous request/reply pair, rather than the current datum. Those skilled in the art will appreciate that the challenge can use any datum whose value is unpredictable by the recipient; random numbers happen to be a particularly convenient choice. Alternatively, the measurement certification device could include a random number generator 18 to generate random numbers internally. In this somewhat weaker version of the CRP, the recipient would not necessarily know that the certified measurement was unique, but only that he had not been sent a copy of a certified measurement he himself had previously received.

Finally, the chaining disclosed above, with respect to hashing, could also be implemented using encryption, wherein a finite number of previous measurements would be incorporated into the encrypted certified measurement.

Although certain exemplary cryptographic operations (hashing, asymmetric encryption, symmetric encryption, chaining, digital certificates, and challenge-response protocols) have been disclosed for use singly or in specified combinations, those skilled in the art will appreciate that many other combinations of these basic operations may be used, depending on the needs of the specific application.

The measurement can be acquired and certified upon receipt of a certification request at input device 12. Input device 12 might be a simple I/O port for receiving an external electronic request, or could include a push-button or other mechanical device to generate the certification request. In the case of an electronic request, the cryptoprocessor 10 might only accept a request encrypted with a public, private, or symmetric key, and the cryptoprocessor 10 would then verify the request prior to providing the requested certified measurement. The external electronic certification request could be generated by a remote location which broadcasts or otherwise transmits the certification request to the measurement certification device.

Alternatively, the certification request could be internally generated under control of the cryptoprocessor 10, according to a predetermined schedule, having either regular or irregular intervals, loaded in RAM 30 or memory 40. Certification in response to a predetermined schedule, rather than requestor control, would be useful in applications such as remote monitoring. The schedule could either be factory loaded (and unalterable) or loadable through input device 12. In the latter case, a request to load the schedule would preferably be encrypted in the device public key, as described above with respect to requester certification. As yet another alternative, certification could be dynamically controlled using an algorithm in which a future certification is set in response to one or more previous certifications. For example, in certain monitoring applications (discussed in more detail below), a normally infrequent certification schedule could be accelerated in response to detection of targeted events.

Figure 2A:
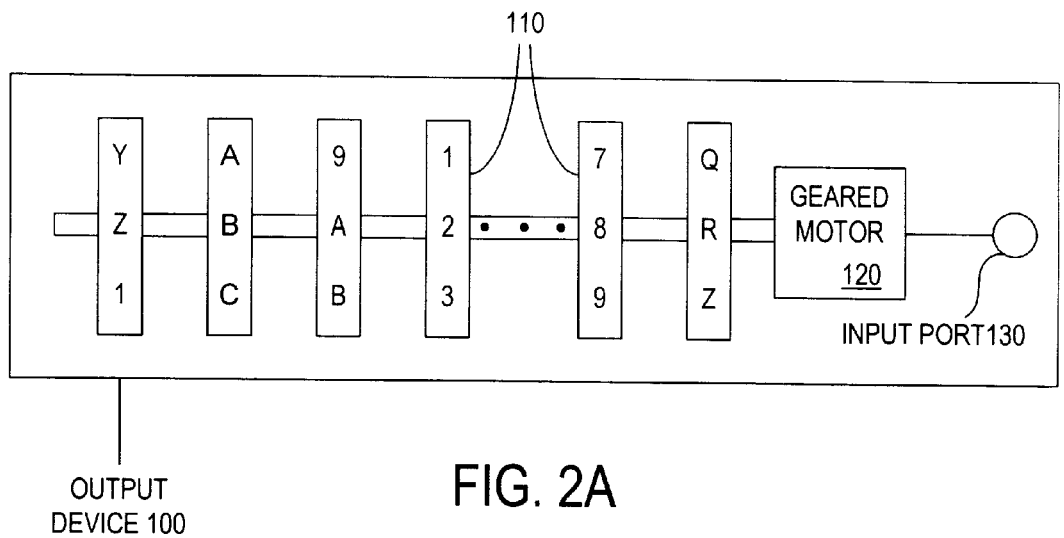
FIGS. 2A,B illustrate bottom and end views, respectively, of a device for printing the certified measurement on paper documents.
Figure 2B:
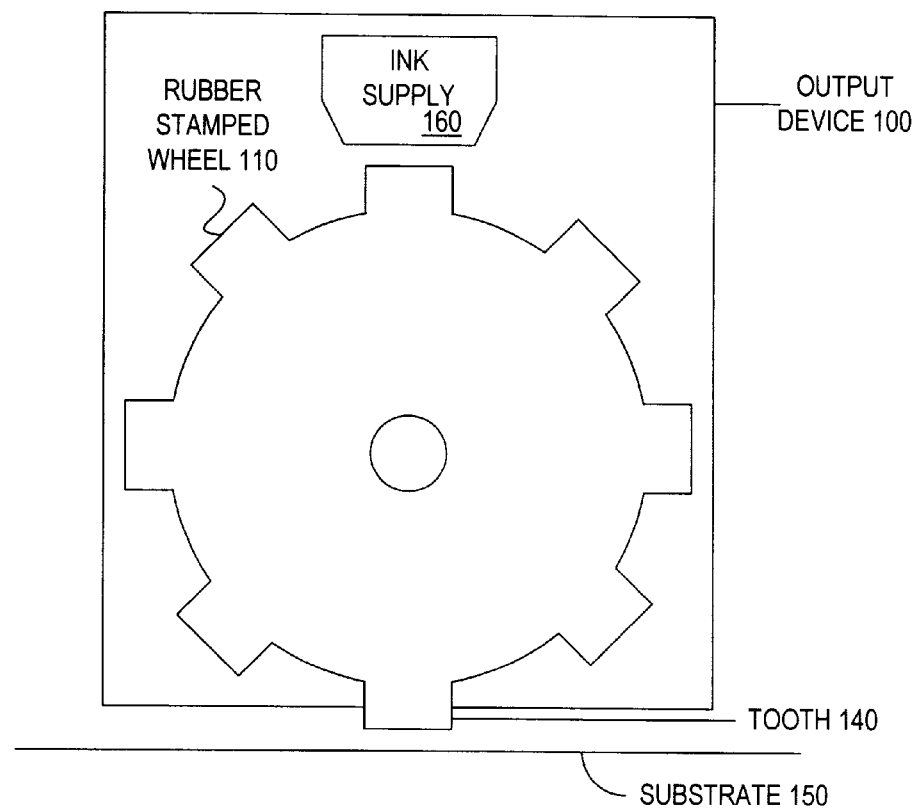

The certified measurement is outputted through output device 100. In a particularly simple embodiment of the invention, the output device 100 might be a printer for recording the certified measurement onto a piece of paper. FIGS. 2A and 2B illustrate bottom and end views, respectively, of an exemplary printwheel device 100. Printwheel device 100 rotates rubber-stamp wheels 10 using geared motors 120 under control of an electrical control signal at input port 130. The wheels 110 have teeth 140 around their circumference to print an alphanumeric code when a selected sequence of teeth 140 is in contact with substrate 150. The teeth 140 receive ink from an ink supply 160. As mentioned previously, the certified measurement would typically include some cryptographic function of the physical measurement and/or time, such as a hash or encrypted code, which one could use to verify the integrity and/or authenticity of the physical measurement and/or time. If used as a stand-alone device, the certification command could be given via a push button or could be generated automatically by pushing down on a spring-loaded housing enclosing printwheel device 100, much like currently available hand-held devices for document stamping. This is particularly useful for mobile data acquisition applications where the entire measurement certification device, including the output device 100, is designed for handheld measurement and certification—for example, a pollution inspectorÆs emissions probe. Access to the measurement certification device could optionally be controlled by requiring an authorized password (e.g., via an alphanumeric keypad) before certification will occur.

Regardless of the configuration of the device, signal flows between the cryptoprocessor and the output device could be secured to provide additional assurance.

As will be discussed in greater detail below, the certified measurement may be outputted via a variety of alternative output devices and media. Whether the certified measurement is printed on a physical document for public display, recorded on media for confidential logging, or displayed once for human reading, its fundamental purpose is for verification by a party who was not present to witness the measurement and certification. Thus, there exists a need for two additional mechanisms: 1) one for verification of the certified measurement, and 2) another for reliably associating the actual physical measurement in question with the certified measurement. These mechanisms are discussed below in the sections entitled ôCertified Measurement Verificationö and ôFraud Deterrenceö, respectively.

Certified Measurement Verification

In cases where the certified measurement uses hashing, the recipient need only read the cleartext part (physical measurement and/or time) and recompute the hash to verify the ciphertext part. If the received and recomputed hashes agree, the measurement has not been changed.

In cases where the measurement is encrypted in the corresponding device private key, the recipient can then simply decrypt the measurement and perform any other cryptographic operations needed to verify the measurement. The recipient would read the certified measurement from the output medium (paper, recording medium, or display), determine the device from the cleartext part of the certified measurement, look up the corresponding public key from a public database, and decrypt the encrypted measurement using the public key. Alternatively, as suggested earlier, digital certificates could be used to distribute the device public key to a certified measurement recipient.

In certain situations, the above procedures are not possible—for example: 1) when public key cryptography is not used, 2) when it is desired to keep the cryptographic algorithms confidential from the recipient, or 3) when the recipient lacks the capability to perform cryptographic verifications. In such cases, the verification can be implemented by a public database located on a central computer accessible via a free or toll-based telephone line. A caller would use his touch-tone keypad to enter the ID number of the measurement certification device and the cleartext and/or ciphertext parts of the certified measurement to be verified. The central computer would use the ID number to look up the database record for that particular device, retrieve its cryptographic key, and use the cryptographic key to perform the appropriate cryptographic operation (recomputed hash, decryption, etc.) and provide a confirmation to the caller.

In general, the recipient will verify the certified measurement by performing some combination of hashing and decryption appropriate to the particular combination of cryptographic operations used to create the certified measurement.

Fraud Deterrence

There are a number of ways in which a fraudulent user may attempt to alter or manipulate a certified measurement. To help illustrate these attacks, consider an exemplary measurement device used to ensure compliance with pollution control laws. The device tracks carbon monoxide levels at a manufacturing facility and prints the resulting certified measurements to a paper substrate which acts as a log of entries.

One method of attack would be to simply remove an incriminating certified measurement from the log. This would entail erasing the certified measurement or perhaps cutting out a portion of the log. Such an action, however, would be detectable if cryptographic chaining were used as described previously. Since each certified measurement can contain a record of a number of prior measurements, deleting one undetectably is impossible without altering all the other measurements.

Instead of deleting a certified measurement, the user could try to replace the measurement with a measurement obtained from another device. The user could find a pollution control device from another location that had lower carbon monoxide levels and use one of its certified measurements as a replacement for the original measurement. This replacement, however, would be easily detected for a number of reasons. The device ID would be incorrect, and any GPS information incorporated into the certified measurement would reveal the wrong location.

The fraudulent user might also attempt to directly alter the plaintext portion of the certified measurement, perhaps changing the carbon monoxide level from thirty parts per billion to three parts per billion. When the measurement was cryptographically certified, however, the plaintext portion would not match the ciphertext portion, revealing the fraud. Attempting to modify the ciphertext portion to match the change in the plaintext portion would require knowledge of the private key or hash algorithms of the measurement device.

Even if the attacker managed to obtain the private key of the measurement device, undetected alteration of certified measurements would be difficult. As described above, chaining techniques would require the attacker to alter all certified measurements from that device. The use of challenge/response protocols would make the alteration even more difficult.

Another defensive tactic involves the use of a secure audit trail. As the measurement device writes certified measurements to the paper log, the values could be contemporaneously stored electronically in non-volatile memory within the secure perimeter. This log might be available for download to disk upon presentation of a password or cryptographic key to the measurement device.

Broadcasting the certified measurements is another effective method of preventing fraud. A user would have to change all copies of the certified measurement to conceal the fraud.

Although the above defensive methods provide a considerable barrier to fraud, there are also physical techniques that may be used in combination with the above to provide even greater levels of security. When certified measurements are applied to a paper substrate, delayed-visibility inks that are initially invisible but develop slowly over time in response to aging or light exposure can be used. The fraudulent user might be required to submit the log of certified measurements to a government agency every two months. If the ink were not visible until three months had passed, the user would be unable to read the certified measurement and thus unable to make alterations. Another defensive technique is to print the certified measurement in such a way that each measurement overlaps at least one other measurement, making it harder to alter one certified measurement without affecting another. Such uncopyable inks or patterns would be especially useful where the document containing the certified measurement is to be transmitted via an unsecured courier.

All of the above attacks and countermeasures have been described in the context of a pollution measuring device, but are in fact independent of the actual measurement technology. Thus, those skilled in the art will appreciate that such countermeasures are equally applicable to any measurement device that outputs the certified measurement in a similar fashion.

Another type of physical fraud involves modifying the measurement input rather than the certified measurement output. That is, a dishonest user might physically tamper with the measurement process, for example, by blowing cold air over a temperature sensor, shining light on an optical sensor, or shielding a pressure sensor. More generally, such fraud might take the form of staging or otherwise modifying the physical parameter or event being measured. One technique for reliably associating the actual physical measurement in question with the certified measurement involves incorporating corroborative information about the physical measurement process into the certified measurement.

Corroborative data might be provided by state detectors that produce a digital signal indicative of normal (or abnormal) operation of the device, for inclusion into the certified measurement. Such detectors may reflect either the internal or external state of the measurement certification device. An internal state detector might provide a normal operation signal as long as the measurement certification device's security measures remained intact and operational. An external state detector might provide a normal operation signal as long as the device was being operated within a prescribed range of environmental conditions. Alternatively, the external state detector could be a secondary sensor providing a measurement corroborative of the primary sensor measurement being certified. Such secondary sensor measurements are especially appropriate where the physical event being measured is characterized by two or more correlated measurements. For example, a fire monitor could use both smoke and temperature measurements, while an explosion monitor could use pressure and noise measurements. Those skilled in the art of sensing will appreciate that these and many other applications of internal or external state detection could be used, depending on the particular application at hand.

State detectors provide an automated or mechanistic measure of the operational state of the measurement certification device. Alternatively, a human witness could enter his unique witness identifier into the measurement certification device as an attestation of the propriety of the measurement process. In a simple form of witness identifier, each witness to the event enters a unique private identifier (such as his private key or personal ID number) into the measurement certification device after the measurement is taken, but before the certified measurement is computed. The private identifier is then incorporated into the cleartext and/or ciphertext portion of the certified measurement. The private identifier could be entered manually via a keypad, or automatically via touch memory buttons (described in more detail below), PCMCIA cards, or other portable personal access tokens.

If greater levels of security are required, a challenge-response protocol can be used to verify that none of the event witnesses has stolen another person's private identifier. After entering his private identifier, a witness would be challenged by the measurement certification device to enter an additional piece of information, such as his mother's maiden name. The response would be compared against its expected value stored in a database in the memory of the measurement certification device when the private identifier was first registered with the device. Incorrect responses would invalidate the previously entered private identifier.

In the above embodiments, users must be careful when entering private identifiers to ensure that they are not stolen by other users of the measurement certification device. To make this process more secure, tokens such as the touch memory buttons manufactured by Dallas Semiconductor can be used. Each measurement certification device user would have his private identifier stored in a touch memory button which consists of a computer chip housed within a small button shaped stainless steel case. The case may be ring-shaped and worn around a user's finger. The chip contains up to 64 kb of RAM or EPROM, sufficient to store a plurality of cryptographic keys. The device transmits data bidirectionally at 16.3 kb per second when placed into contact with a reader device, which would reside within the measurement certification device. The user touches the button device to the reader each time that he wants his private identifier incorporated into the certified measurement. Each chip contains a unique serial number that is laser-etched into the chip at the time of manufacture. The DS 1427 configuration includes a tamper-resistant real-time clock that may be utilized as a supplementary audit trail to that in the measurement certification device, so that authenticatable information would also be stored in the user's touch memory button in addition to being incorporated into the certified measurement.

Still greater levels of security can be obtained if biometric readers are built into the measurement certification device for incorporating biometric data (e.g., fingerprint, voiceprint, retinal pattern or any other unique physiological parameter) into the certified measurement. Biometric readers could also be used to authenticate the private identifiers that are entered by all witnesses.

Finally, instead of or in addition to human identifiers, the corroborative data could originate from other devices. For example, a second measurement device could take an independent measurement of the physical parameter in question, and provide that measurement to the primary measurement device for inclusion in the primary measurement device/Es certified measurement. The corroborative measurement could either be in cleartext or cryptographic form. Those skilled in the art will appreciate that the cryptographic form could include any combination of hashing, encryption, digital certificates, challenge-response protocols, and other cryptographic techniques disclosed herein with respect to the primary measurement certification device. Alternatively, the second measurement device could send only a corroborative data identifier to the primary measurement device, but retain (or otherwise escrow) the corroborative measurement in a safe location.

Alternative Time Sources

It was mentioned previously that the time is generated via an internal clock 20. In another embodiment of the invention, the measurement certification device could obtain time from an external source via signal receiver 24 disposed inside the secure perimeter 70. The signal receiver 24 could receive time signals from ground stations (e.g., the US Naval Observatory atomic clock), from orbiting satellites, or from any other trusted external time source. External time signals are especially advantageous for deterring hacking of an internal clock.

In the satellite example, the measurement certification device could receive timing signals from the American Global Positioning System (GPS), for which sensors (receivers) are widely available on the commercial market. Alternatively, the receiver could receive signals from the Russian Glonass system. Although GPS is primarily used for location finding, those skilled in the art will appreciate that the same timing signals can also be used as an accurate time source. Consequently, the signal receiver 24 may be used as an alternative time generator to clock 20. These basic operating principles of satellite ranging systems are well known (e.g., Herring, "The Global Positioning System", Scientific American, Feburary 1996, pp. 44–50; and "How Does GPS Work", Jane's Intl. Defense Review, Dec. 31, 1994, p. 147) but will be briefly summarized below to illustrate the dual location- and time-determining capabilities of GPS.

Any signal sent from a satellite to a terrestrial receiver is delayed by an amount proportional to the distance from the satellite to the receiver. Therefore, the difference between a clock signal sent from a satellite and a receiver's local clock (typically a few hundredths of a second) will determine the distance from the satellite to the receiver. Knowing this distance establishes that the receiver is located somewhere on the surface of a sphere, of radius equal to the determined distance, centered about the satellite. However, the receiver's exact location—a particular point on the surface of that sphere—remains undetermined. By receiving signals from several orbiting satellites, the receiver's exact three-dimensional location on the surface of the earth can be determined as the point of intersection of all their locating spheres.

In practice, the receiver clock is cheaper, and therefore less accurate, than the satellites' highly accurate atomic clocks. This means that all of the locating spheres will be slightly smaller or larger than their true values, depending on whether the receiver clock runs slow or fast, respectively. Consequently, the location spheres may not intersect at a single point. This difficulty is overcome by adjusting the receiver clock by an arbitrary amount, which in turn changes each of the location radii by the same amount, and to check for a single point of intersection of the locating spheres. If not, the receiver clock is readjusted, in an iterative process, until a single point of intersection is found. That is, the inaccurate receiver clock provides a good initial guess regarding the point of intersection, and the fact that the locating spheres must intersect at a single point corresponding to the receiver's terrestrial location is used to improve the initial guess. Taken to its extreme, such iteration could be performed without requiring a receiver clock at all—this would simply require more iterations than if the receiver clock had been available to provide an initial guess.

The end result of the iteration process is a determination of both the exact location of the receiver and the correct time. This time can then be used as part of the certification process. Of course, if high time accuracy is not required (the received GPS time is only off by a few hundredths of a second), the measurement certification device could simply accept the received satellite clock signal (or an average of several such signals) as an approximation to the correct time without performing the iterative process described above.

Finally, as is currently done for certain military applications, the received time signals could be encrypted in the time transmitter's private key, or in the receiver's public key, as an extra measure of assurance that an impostor has not substituted an incorrect time for that of the broadcast source. In the latter example, the broadcasted time signal may be thought of as narrowcasted because only a specific recipient can decrypt the time. In such applications, the cryptoprocessor 10, RAM 30 and memory 40 may be used to perform the necessary decrypting (or other decoding). It will be advantageous to dispose the receiver within the secure perimeter to prevent insertion of fraudulent signals. Alternatively, an encrypted time could be certified without prior decryption, with this step to be performed by the recipient during subsequent verification.

As the foregoing illustrates, the signal receiver 24 could either supplement or replace the clock 20. In certain embodiments, the clock 20 could be used to double-check the received time (or vice-versa) by comparing the received time against the internal clock time—which could have been set at the factory or by a previous radio broadcast. The received time would be deemed accurate provided the two times agreed to within the cumulative inaccuracies of the received signal (external time source inaccuracy plus any uncorrected transmission delay) and the internal clock 20. Such double-checking might be especially useful where the GPS signals are broadcast in slightly degraded form (e.g., the Standard Positioning mode used in many commercial applications).

Authenticated Location

In certain cases, it will be desired to certify both the time and geographical location at which the physical measurement was taken. As discussed above with respect to external time, the GPS signal receiver 24 is also ideally suited to provide the necessary location signals. Such signals would be incorporated into the certified measurement, along with the physical measurement and time, in cleartext and/or cryptographic form. Even if no separate physical measurement is made, the location per se—itself a physical parameter—would be considered the physical measurement to be certified.

Alternative Output Devices

It was mentioned previously that the certified measurement could be printed to paper using a simple printwheel mechanism, but more sophisticated printers can also be used at the output device. For example, the printer could include traditional dot- or character-based computer printers (e.g., laser, bubble, inkjet, daisywheel, or line printers) as well as facsimile machines, photocopiers, or even barcode printers. Each of these devices could route a certification request through input 12, either automatically upon document printing or manually upon operator request (e.g., a "certify" button to be used manually after printing a page). Furthermore, manual or automatic operation could be selectable via an on/off toggle.

Still other output devices are possible, especially when the certified measurement is not required to be directly printed on a paper substrate. For example, the output device could be printed on a special, difficult-to-forge label to be applied to the surface of a paper document or other substrate. Furthermore, the certified measurement has been described previously as a human-readable alphanumeric code, but this is not necessary. Any machine-readable, optically detectable code would serve equally well, and might be preferred to deter casual snooping. For example, the certified measurement could be a fine mesh of dots covering the paper substrate. The dots could be laid down using any arbitrary machine-readable coding scheme. For example, the distance between individual dots could represent the digits of the ciphertext part of the certified measurement. Such an embodiment is most practically performed by a measurement certification device connected to a printer or fax machine which is easily capable of setting down such a fine mesh of dots.

Machine-readable, optically-detectable codes are also appropriate when the output device is a recorder used for writing the certified measurement to a non-paper medium. Certain of these media have an added advantage of being write-only, which can provide extra assurance against measurement modification. For example, an electromagnetic write head could write to magnetic media (e.g., diskette or tape), a laser could write to optical media (e.g., CD-ROM or magneto-optical disk), or an electric charge could be applied to semiconductor media (e.g., a DRAM or PROM).

As yet another alternative, the certified measurement need not be written to a permanent or semi-permanent media, but could be displayed for transient viewing on an electronic or other display in human- or machine-readable form. This would be useful, for example, in a monitoring process whereby the measurement is indicative of the existence and normal operation of the monitored device.

Finally, the output device 100 in FIG. 1 could be a transmitter for transmitting the measurement to a remote location. The transmitter would be triggered under control of the measurement output methodology or the intended use of the measurement certification device. For example, as described previously, certified measurements could be transmitted at predetermined intervals under the control of the cryptoprocessor. Alternatively, the transmitter could contain logic to accumulate the certified measurements and only transmit them upon external request. Or, the transmitter could itself initiate the certified measurement in response to a received external request, e.g., the transmitter could be combined with the input device 12 in the form of a transponder. Finally, in certain applications, the certified measurement could be escrowed rather than transmitted, so that an authorized party could trace the location without necessarily broadcasting the information. The escrow could either be internal or external.

Certification Requests

It was mentioned previously that the measurement certification device could operate in response to an external request received at the input device 12. Although such an external request will often be a request from a measurement recipient, it could also be generated automatically upon detection of an event external to the measurement certification device. Such an event could be any normal or abnormal occurrence that is to be transmitted to the recipient of the signal. Thus, input device 12 need not be a separate device, but could be integrated with sensor 8.

For example, where the measurement certification device is used for mobile applications, normal events might include entering an automated toll road or a police car passing a prescribed checkpoint. Conversely, abnormal events might include a rental car leaving an authorized operating area or detection of air bag inflation in the event of an accident. In the latter example, the combination of certification, satellite triangulation for location, other sensors to detect a triggering event, and a transmitter leads to an automated distress call system for summoning assistance in the event of an emergency. Such a system would have natural applications in mobile applications (e.g., cars) where the vehicle location must be transmitted to the rescuer. For example, the GPS receiver could be linked to a transmitter for broadcasting the carÆs location upon receipt of an authorized request at an airbag sensor. Considered together, the GPS receiver, transmitter, and airbag sensor could be regarded as a transponder. The actual transmitters, receivers, and sensors needed for such location transmitters will not be discussed in detail, as those skilled in the art will appreciate that all the necessary components are widely commercially available. For example, the Lojak car anti-theft system uses such components—but without certification or cryptographic assurance—to transmit a stolen carÆs location upon request of a radio signal. Location transmitters would also be useful for non-mobile applications where the location data, in conjunction with the device ID, would serve to deter false or prank distress calls. Such a transmitter could take many forms, ranging from a dedicated, single-purpose module located within the secure perimeter to a cellular phone or other external, multi-purpose telecommunications device. As yet another example, the transmitter could be augmented with an automatic cut-off switch triggered upon the abnormal event to form a so-called ôdead manÆs switchö to disable potentially dangerous equipment until assistance arrives.

Still other applications of certified location include a device to enforce house arrest, a secure gambling device that only worked within a certain state or country, a radio that changed its presets in different geographical locations, a mobile vending machine that collected sales taxes according to the state it was in, a car that stopped working if taken across the border, and a smart bomb that would not explode over friendly territory.

The above examples illustrate several of many possible mobile uses of measurement certification devices in connection with location certification. Of course, the physical parameter being measured need not be restricted to location, but could include any physical quantity capable of being transduced into a digital signal by a secure sensor. Location certification simply happens to be a natural application of mobile measurement certification devices.

Conversely, a stationary measurement certification device could be used to track a mobile physical event. For example, an array of smog sensing devices could be used to track pollutant dispersion for air quality studies. These and many other different combinations of measurement certification and location certification will be known to those skilled in the art.

For purposes of illustration only, and not to limit generality, the present invention has been explained with reference to various examples of time sources, cryptographic operations, output devices, and sensors. However, one skilled in the art will appreciate that the invention is not limited to the particular illustrated embodiments or applications, but includes many others that operate in accordance with the principles disclosed herein.

What is claimed is:

1. A device for secure measurement acquisition and certification, comprising:

(a) a sensor;

(b) a time generator;

(c) a computing device, including a computer processor and a memory, coupled to receive (i) a digital signal representative of a physical measurement from the sensor and (ii) a time from the time generator; said computing device configured for forming an augmented measurement including the digital signal and the time, and for performing a cryptographic operation on at least a portion of the augmented measurement to form a certified measurement; and (d) an output device, coupled to the computing device, for writing the certified measurement in response to a certified measurement request;

wherein the sensor, the time generator, and the computing device are configured to be resistant to tampering.

2. The device of claim 1 wherein the time generator is a signal receiver configured for receiving an external timing signal.

3. The device of claim 2 wherein the external timing signal is a satellite-based signal.

4. The device of claim 2 wherein the external timing signal is a ground-based signal.

5. The device of claim 2 wherein the signal receiver is configured for receiving an encrypted signal.

6. The device of claim 2 further comprising a clock.

7. The device of claim 1 wherein the time generator includes a clock.

8. The device of claim 1 configured to generate the certified measurement request according to a predetermined schedule.

9. The device of claim 1 wherein the cryptographic operation includes a one-way function.

10. The device of claim 9 wherein the one-way function is associated with a cryptographic key.

11. The device of claim 9 wherein the one-way function includes a representation of the time.

12. The device of claim 9 wherein the one-way function includes a representation of a non-time datum.

13. The device of claim 9 wherein the one-way function includes a representation of an earlier certified measurement.

14. The device of claim 1 wherein the cryptographic operation includes encryption with an encryption key.

15. The device of claim 14 wherein the encryption incorporates a representation of an earlier certified measurement.

16. The device of claim 14 wherein the encryption key belongs to an asymmetric cryptographic protocol.

17. The device of claim 14 where the encryption key belongs to a symmetric cryptographic protocol.

18. The device of claim 1 where the memory is configured for storing a device identification to be included in the certified measurement.

19. The device of claim 1 further comprising an input device for receiving the certified measurement request.

20. The device of claim 19 wherein the input device includes a signal receiver.

21. The device of claim 19 wherein the certified measurement request includes a password.

22. The device of claim 19 wherein the certified measurement request includes a quantity encrypted with an encryption key.

23. The device of claim 22 wherein the encryption key belongs to an asymmetric cryptographic protocol.

24. The device of claim 22 wherein the encryption key belongs to a symmetric cryptographic protocol.

25. The device of claim 19 wherein the certified measurement request includes a datum for use with a challenge-response protocol.

26. The device of claim 1 further comprising a number generator.

27. The device of claim 1 wherein the output device is a printer.

28. The device of claim 27 wherein the printer is configured for producing a dot-based output.

29. The device of claim 28 wherein the printer is a facsimile machine.

30. The device of claim 27 wherein the printer is configured for producing character-based output.

31. The device of claim 27 wherein the printer is configured for printing a certified measurement with an uncopyable ink.

32. The device of claim 27 wherein the printer is configured for printing the certified measurement as an uncopyable pattern.

33. The device of claim 1 wherein the output device is configured for use with a magnetic medium.

34. The device of claim 1 wherein the output device is configured for use with an optical medium.

35. The device of claim 1 wherein the output device is configured for use with a semiconductor medium.

36. The device of claim 1 wherein the output device includes a display.

37. The device of claim 1 further comprising a transmitter.

38. The device of claim 1 wherein the digital signal is representative of a location.

39. The device of claim 38 wherein the digital signal acts as the certified measurement request.

40. The device of claim 38 wherein the digital signal includes an encrypted quantity.

41. The device of claim 1 further comprising a signal generator for providing a corroborative datum, indicative of an operational condition of the device, to be included in the certified measurement.

42. The device of claim 41 wherein the signal generator is a sensor responsive to an external state of the device.

43. The device of claim 41 wherein the signal generator is a biometric reader.

44. The device of claim 41 wherein the signal generator is a sensor responsive to an internal state of the device.

45. The device of claim 41 wherein the signal generator is an input station configured for receiving a witness identifier.

46. The device of claim 41 wherein the signal generator is configured for receiving the corroborative datum from a second measurement device.

47. A device for secure measurement acquisition and certification, comprising:
 (a) a sensor;
 (b) a signal receiver;
 (c) a computing device, including a computer processor and a memory, coupled to receive (i) a digital signal representative of a physical parameter from the sensor and (ii) an external timing signal from the signal receiver; said computing device configured for forming an augmented measurement including the digital signal and a representation of the external timing signal, and for performing a cryptographic operation on at least a portion of the augmented measurement to form a certified measurement;
 wherein the sensor, the signal receiver, and the computing device are configured to be resistant to tampering.

48. The device of claim 47 wherein the external timing signal is a satellite-based signal.

49. The device of claim 47 wherein the external timing signal is a ground-based signal.

50. The device of claim 47 wherein the signal receiver is configured for receiving an encrypted signal.

51. The device of claim 47 further comprising a clock.

52. The device of claim 47 wherein the external timing signal is representative of time.

53. The device of claim 47 configured to generate the certified measurement request according to a predetermined schedule.

54. The device of claim 47 wherein the cryptographic operation includes a one-way function.

55. The device of claim 54 wherein the one-way function is associated with a cryptographic key.

56. The device of claim 54 wherein the one-way function includes a representation of time derived from the external timing signal.

57. The device of claim 54 wherein the one-way function includes a representation of a non-time datum.

58. The device of claim 55 wherein the one-way function includes a representation of an earlier certified measurement.

59. The device of claim 47 wherein the cryptographic operation includes encryption with an encryption key.

60. The device of claim 59 wherein the encryption incorporates a representation of an earlier certified measurement.

61. The device of claim 59 wherein the encryption key belongs to an asymmetric cryptographic protocol.

62. The device of claim 59 where the encryption key belongs to a symmetric cryptographic protocol.

63. The device of claim 47 where the memory is configured for storing a device identification to be included in the certified measurement.

64. The device of claim 47 further comprising an input device for receiving the certified measurement request.

65. The device of claim 64 wherein the input device includes a signal receiver.

66. The device of claim 64 wherein the certified measurement request includes a password.

67. The device of claim 64 wherein the certified measurement request includes a quantity encrypted with an encryption key.

68. The device of claim 67 wherein the encryption key belongs to an asymmetric cryptographic protocol.

69. The device of claim 67 wherein the encryption key belongs to a symmetric cryptographic protocol.

70. The device of claim 64 wherein the certified measurement request includes a datum for use with a challenge-response protocol.

71. The device of claim 47 further comprising a number generator.

72. The device of claim 47 further comprising an output device for writing the certified measurement.

73. The device of claim 72 wherein the output device is a printer.

74. The device of claim 73 wherein the printer is configured for producing a dot-based output.

75. The device of claim 74 wherein the printer is a facsimile machine.

76. The device of claim 73 wherein the printer is configured for producing character-based output.

77. The device of claim 73 wherein the printer is configured for printing a certified measurement with an uncopyable ink.

78. The device of claim 73 wherein the printer is configured for printing the certified measurement as an uncopyable pattern.

79. The device of claim 72 wherein the output device is configured for use with a magnetic medium.

80. The device of claim 72 wherein the output device is configured for use with an optical medium.

81. The device of claim 72 wherein the output device is configured for use with a semiconductor medium.

82. The device of claim 72 wherein the output device includes a display.

83. The device of claim 47 further comprising a transmitter.

84. The device of claim 47 wherein the external timing signal is representative of a location.

85. The device of claim 84 wherein the external timing signal acts as the certified measurement request.

86. The device of claim 84 wherein the external timing signal includes an encrypted quantity.

87. The device of claim 47 further comprising a signal generator for providing a corroborative datum, indicative of an operational condition of the device, to be included in the certified measurement.

88. The device of claim 87 wherein the signal generator is a sensor responsive to an external state of the device.

89. The device of claim 87 wherein the signal generator is a biometric reader.

90. The device of claim 87 wherein the signal generator is a sensor responsive to an internal state of the device.

91. The device of claim 87 wherein the signal generator is an input station configured for receiving a witness identifier.

92. The device of claim 87 wherein the signal generator is a receiver for receiving the corroborative datum from a second measurement device.

93. A device for secure measurement acquisition and certification, comprising:
 (a) a sensor;
 (b) a time generator;
 (c) a signal generator;
 (d) a computing device, including a computer processor and a memory, coupled to receive (i) a digital signal representative of a physical parameter from the sensor, (ii) a time from the time generator, and (iii) a corroborative datum indicative of an operating condition of the device from the signal generator, said computing device configured for forming an augmented measurement including the digital signal, the time, and the corroborative datum, and for performing a cryptographic operation on at least a portion of the augmented measurement to form a certified measurement;
 wherein the sensor, the time generator, the signal generator, and the computing device are configured to be resistant to tampering.

94. The device of claim 93 wherein the time generator is a signal receiver configured for receiving an external timing signal.

95. The device of claim 94 wherein the external timing signal is a satellite-based signal.

96. The device of claim 94 wherein the external timing signal is a ground-based signal.

97. The device of claim 94 wherein the signal receiver is configured for receiving an encrypted signal.

98. The device of claim 94 further comprising a clock.

99. The device of claim 93 wherein the time generator includes a clock.

100. The device of claim 93 configured to generate the certified measurement request according to a predetermined schedule.

101. The device of claim 93 wherein the cryptographic operation includes a one-way function.

102. The device of claim 101 wherein the one-way function is associated with a cryptographic key.

103. The device of claim 101 wherein the one-way function includes a representation of the time.

104. The device of claim 101 wherein the one-way function includes a representation of a non-time datum.

105. The device of claim 101 wherein the one-way function includes a representation of an earlier certified measurement.

106. The device of claim 93 wherein the cryptographic operation includes encryption with an encryption key.

107. The device of claim 106 wherein the encryption incorporates a representation of an earlier certified measurement.

108. The device of claim 106 wherein the encryption key belongs to an asymmetric cryptographic protocol.

109. The device of claim 106 where the encryption key belongs to a symmetric cryptographic protocol.

110. The device of claim 93 where the memory is configured for storing a device identification to be included in the certified measurement.

111. The device of claim 93 further comprising an input device for receiving the certified measurement request.

112. The device of claim 111 wherein the input device includes a signal receiver.

113. The device of claim 111 wherein the certified measurement request includes a password.

114. The device of claim 111 wherein the certified measurement request includes a quantity encrypted with an encryption key.

115. The device of claim 114 wherein the encryption key belongs to an asymmetric cryptographic protocol.

116. The device of claim 114 wherein the encryption key belongs to a symmetric cryptographic protocol.

117. The device of claim 111 wherein the certified measurement request includes a datum for use with a challenge-response protocol.

118. The device of claim 93 further comprising a number generator.

119. The device of claim 93 further comprising an output device for writing the certified measurement.

120. The device of claim 119 wherein the output device is a printer.

121. The device of claim 120 wherein the printer is configured for producing a dot-based output.

122. The device of claim 121 wherein the printer is a facsimile machine.

123. The device of claim 120 wherein the printer is configured for producing character-based output.

124. The device of claim 120 wherein the printer is configured for printing the certified measurement with an uncopyable ink.

125. The device of claim 120 wherein the printer is configured for printing the certified measurement as an uncopyable pattern.

126. The device of claim 119 wherein the output device is configured for use with a magnetic medium.

127. The device of claim 119 wherein the output device is configured for use with an optical medium.

128. The device of claim 119 wherein the output device is configured for use with a semiconductor medium.

129. The device of claim 119 wherein the output device includes a display.

130. The device of claim 93 further comprising a transmitter.

131. The device of claim 93 wherein the time generator is configured for generating a location signal, in addition to the time.

132. The device of claim 131 configured for including a representation of the location signal in the certified measurement.

133. The device of claim 131 wherein the location signal acts as the certified measurement request.

134. The device of claim 131 wherein the location signal includes an encrypted quantity.

135. The device of claim 93 further comprising a signal generator for providing a corroborative datum, indicative of an operational condition of the device, to be included in the certified measurement.

136. The device of claim 135 wherein the signal generator is a sensor responsive to an external state of the device.

137. The device of claim 135 wherein the signal generator is a biometric reader.

138. The device of claim 135 wherein the signal generator is a sensor responsive to an internal state of the device.

139. The device of claim 135 wherein the signal generator is an input station configured for receiving a witness identifier.

140. The device of claim 135 wherein the signal generator is a receiver for receiving the corroborative datum from a second measurement device.

141. A method for measuring and certifying a physical parameter, comprising the steps of:
- (a) measuring a physical parameter to provide a digital signal representative thereof;
- (b) providing a time;
- (c) forming an augmented measurement including the digital signal and the time;
- (d) performing a cryptographic operation on at least a portion of the augmented measurement to form a certified measurement; and
- (e) outputting the certified measurement to a local output device;
  wherein the steps of measuring the physical parameter, providing the time, forming the augmented measurement, and performing the cryptographic operation are performed in a tamper-resistant manner.

142. A method for measuring and certifying a physical parameter, comprising the steps of:
- (a) measuring a physical parameter to provide a digital signal representative thereof;
- (b) providing an external timing signal;
- (c) forming an augmented measurement including the digital signal and a representation of the external timing signal;
- (d) performing a cryptographic operation on at least a portion of the augmented measurement to form a certified measurement; and
- (e) outputting the certified measurement;
  wherein the steps of measuring the physical parameter, receiving the external timing signal, forming the augmented measurement, and performing the cryptographic operation are performed in a tamper-resistant manner.

143. A method for measuring and certifying a physical parameter, comprising the steps of:
- (a) measuring a physical parameter to provide a digital signal representative thereof;
- (b) providing a time;
- (c) providing a corroborative datum indicative of an operating condition of the device;
- (d) forming an augmented measurement including the digital signal, the time, and the corroborative datum;
- (e) performing a cryptographic operation on at least a portion of the augmented measurement to form a certified measurement; and
- (f) outputting the certified measurement;
  wherein the steps of measuring the physical parameter, providing the time, providing the corroborative datum, forming the augmented measurement, and performing the cryptographic operation are performed in a tamper-resistant manner.

* * * * *